C. W. MORDEN.
DIFFERENTIAL THREAD COUPLING FOR CONDUIT MEMBERS.
APPLICATION FILED AUG. 16, 1912.
1,128,997.
Patented Feb. 16, 1915.
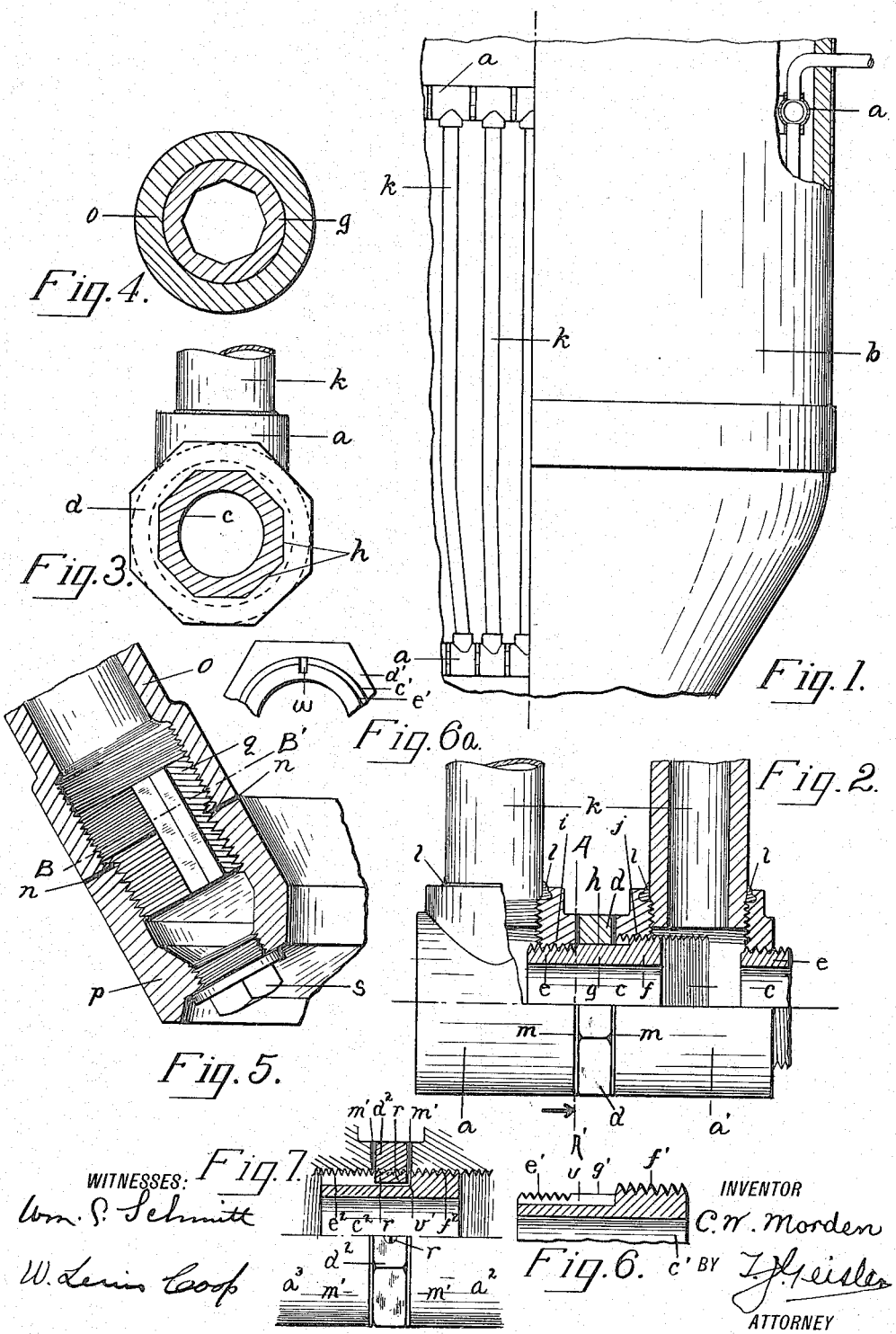
WITNESSES:
INVENTOR
C. W. Morden
BY
ATTORNEY
THE NORRIS PETERS CO., PHOTO-LITHO., WASHINGTON, D. C.

UNITED STATES PATENT OFFICE.

CHARLES W. MORDEN, OF PORTLAND, OREGON.

DIFFERENTIAL-THREAD COUPLING FOR CONDUIT MEMBERS.

1,128,997.            Specification of Letters Patent.      Patented Feb. 16, 1915.

Application filed August 16, 1912. Serial No. 715,517.

*To all whom it may concern:*

Be it known that I, CHARLES W. MORDEN, a citizen of the United States, and a resident of Portland, county of Multnomah, State of Oregon, have invented a new and useful Improvement in Differential-Thread Couplings for Conduit Members, of which the following is a specification.

My invention relates to the joining together of cored columns, conduits, or pipe sections, under conditions rendering it desirable that the whole device be built of individually removable sections, but the available space is exceedingly limited.

My invention further deals with conditions requiring a tight joint between the connected conduit sections because of the latter being immersed in a corroding fluid. In the light of present knowledge, it is comparatively a simple matter to confine corroding fluid in a pipe or conduit so as to prevent its escape through the crevices between abutting pipe ends, but in the present invention the conduit conducts a harmless heating agent while the conduit is immersed in the corroding fluid against which the joints of the conduit must be effectively protected, in order to prevent undue wear and thus undue shortening of the life of the apparatus.

My invention particularly concerns the construction of what is known as the "headers," being an element of the heating means provided for vertical pulp digesters of the type disclosed in my application for Letters Patent for an improvement in heating means for vertical digesters, filed in the United States Patent Office June 5, 1912, Serial Number 701,933.

The purpose of my invention is to draw the two end faces of the companion header-sections or heater conduits or pipes into abutment with each other, or against an intermediate member, and in so doing to cover completely, and effectively protect, the threads between the uniting member, *e. g.* the nipple, and the conduit members joined thereby.

A flange coupling would require too great a space to suit the condition imposed. It also is an awkward arrangement with regard to the facility for getting at the bolts uniting the companion flanges. Furthermore the bolts must be made of bronze and in consequence of their limited size are weak, and acid gets under the heads of the bolts and eats out the surfaces.

In order to attain the purpose in mind, I join the companion conduit members by means of a nipple, and so construct and arrange the parts that the nipple can be moved into one of the joined conduit sections while assembling or disconnecting the parts. In consequence of such features of my invention, a small space between the opposed faces of the joined members is ample for the assemblage, and removal, of either, of the members. In order to accomplish said result I use a nipple provided with threads at its opposite ends of different pitch but running in the same general direction. By means of such nipple I draw the two end faces of the joined conduit members either into abutment with each other or against an intermediate member, interposing gaskets or other suitable packing between the abutting faces, as convenient.

By making the threads on the opposite ends of the nipple, and the related parts of the members coupled thereby, of different pitch but of the same hand a powerful differential action may be obtained for bringing the abutting faces of the parts coupled together with great force.

Referring now to the accompanying drawings: Figure 1 is a fragmental view of a vertical digester showing a portion of its heating pipes coupled by means embodying my invention; Fig. 2 shows on a larger scale, partly in section, one mode of coupling two contiguous sections or members of the lower hollow ring of the upper heating unit installed in a pulp digester, into which ring members the upright pipes are threaded: Fig. 3 is a cross section on the line A—A of Fig. 2, looking in the direction pointed by the arrow; Fig. 4 shows a cross section on line B—B of Fig. 5. Fig. 5 shows a section of the lower heating unit of a vertical digester of the type referred to, this figure illustrating the application of my coupling to such lower heating unit, the section being taken as follows: transversely of the horizontal bottom ring of such heating unit, longitudinally of one of the pipes coupled to such ring, and the nipple being shown half in side elevation and half in longitudinal section; Fig. 6 is a fragmental, longitudinal section of a different type of nipple which may be used for effecting the coupling illustrated in Fig. 2; the difference being that in Fig. 2 the nipple shown is made with an octagonal periphery to receive an octagonal collar, while in Fig. 6 the periphery of the nipple is circular, and the collar is held against rotating on the nipple by means of a spline entering a longitudinal exterior slot of the nipple as illustrated in the fragmental end-view Fig. 6$^a$; and Fig. 7 represents a similar type of nipple as shown in Figs. 6, 6$^a$, except that the differential threads of the two ends of the nipple and of the members coupled thereby lie all in the same cylindrical surface.

Referring in the first instance to the illustration of one type of my invention shown in Fig. 2; each of the ring or conduit sections $a$ is provided with internally threaded portions as $i$, $j$, adapted to take the exteriorly threaded ends $e$, $f$, of the nipple $c$, respectively; and the parts are arranged to permit the nipple $c$ to be moved into the portion $j$, entirely if required.

The nipple $c$, is made with a differential thread at its ends $e$ and $f$, and the middle part, $g$, is made with octagon faces which engage the inner faces, $h$, $h$, of the collar $d$, (see Fig. 3). The end $e$, of the nipple, $c$, is of less diameter than the middle portion $g$, and the end, $f$, is of greater diameter than either. The end $f$ has a slightly greater number of threads per inch than the end $e$, but both ends are of the same "hand."

In assembling the parts to be coupled, the end $f$ of the nipple $c$ is screwed into a "header" section, $a'$. Packing rings or gaskets $m$, and the collar $d$ are placed on the middle portion $g$ of the nipple, and the opposite end $e$ of the nipple is then screwed in to the ring section $a$. The nipple is then rotated by applying a wrench on the collar $d$, and by reason of the greater number of threads per inch on the end $f$, the latter will leave its ring section $a'$ less rapidly than the end $e$ will enter the other section $a$, thus the two will be drawn together until they jam against the gaskets $m$. It will be seen that when so arranged no part of the threads of the nipple or the ring members coupled thereby will be exposed to the acid in which the parts are immersed and as shown in Fig. 2, the threads of the heater pipes $k$, $k$, are protected by a suitable acid resisting packing $l$. It will also be noted that any section or member of the ring may be removed without disturbing the adjoining members thus facilitating repair.

In Fig. 6 is shown a different form of nipple. The nipple $c'$ has ends, $e'$, $f'$, made with differential threads, the middle portion, $g'$, being of circular cross-section but having a longitudinal slot $v$.

The eye of the collar $d'$ is circular, but the collar is held against rotation on the nipple by a spline $w$ riding in the slot $v$, as shown in Fig. 6$^a$, the exterior of the collar $d'$ is made octagonal to provide a grip for a wrench. This construction permits the nipple to be screwed into the ring member $a'$ to such extent that only a small portion of the end $e'$ projects beyond the end face of the members $a'$. This is convenient when it is desired to remove the collar $d'$ between two assembled sections, in order to renew worn packing between the abutting faces.

In order to remove the collar from the nipple of a coupling arranged as shown in Fig. 2, the nipple would in the first instance be screwed into the part $a'$ as far as possible by rotating the collar $d$, and then the parts $a$ $a'$ would have to be sprung apart sufficiently to permit the removal of the collar $d$.

In Fig. 7, is shown still another type of nipple, and a corresponding modification in the threaded orifice of the parts coupled by the nipple. The threaded ends of the nipple here shown have the same diameter, they are of the same "hand," but the threads of the end $e^2$ have a different pitch from those of the end $f^2$.

The outside diameter of the threads of the nipple is slightly less than the interior diameter of the collar $d^2$, so that the collar may be moved freely over either of the parts $e^2$, $f^2$, the exterior of this collar $d^2$ being adapted for the use of a wrench. Splines $r$, enter slots $v'$ of the nipple and thus hold the collar against rotating on the nipple, but allow the collar longitudinal travel on the nipple.

One end of the nipple $c^2$ is inserted in the ring section $a^2$ (see Fig. 7) whose threads are of greater pitch than the threads of the ring section $a^3$ into which the other end of the nipple is inserted. A rotation of the collar $d^2$ will draw the two ring sections $a^2$ and $a^3$, forcibly together against the gaskets $m'$ thus making a tight joint. Since the connected elements in each example of my invention, as illustrated in the drawings, represent a part of the conduit through which the heating agent is carried, I will for convenience, in the claim, refer to the coupled parts under the general term conduit member.

I claim:

In a heating device, the combination with conduit-members arranged side by side, and having ends provided with opposing orifices of unequal diameter and internally threaded, the threads being of the same hand but of different pitch; a nipple made with opposite ends of a diameter corresponding to the diameter of the opposing orifices of the conduit members, the ends of the nipple being threaded into the threaded orifices of the adjacent conduit members; and means providing a purchase for an instrument wherewith to rotate the nipple; the parts being constructed to permit the nipple to be moved approximately its full length into the orifice of the larger diameter, whereby the coupling and uncoupling may be effected within the space provided by a minimum separation of adjacent conduit members.

CHARLES W. MORDEN.

Witnesses:
Wm. C. Schmitt,
Carlyle D. Geisler.

Copies of this patent may be obtained for five cents each, by addressing the "Commissioner of Patents, Washington, D. C."